United States Patent
Stortz et al.

(10) Patent No.: US 8,650,232 B2
(45) Date of Patent: Feb. 11, 2014

(54) SYSTEM AND METHOD FOR DETERMINATION OF A HORIZONTAL MINIMUM OF DIGITAL VALUES

(75) Inventors: Rochelle L. Stortz, Austin, TX (US); Raymond A. Bertram, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 1143 days.

(21) Appl. No.: 12/605,702

(22) Filed: Oct. 26, 2009

(65) Prior Publication Data
US 2011/0095785 A1 Apr. 28, 2011

(51) Int. Cl.
*G06F 7/00* (2006.01)
*G06F 9/22* (2006.01)

(52) U.S. Cl.
USPC ............ 708/207; 708/627; 708/700; 708/709

(58) Field of Classification Search
USPC .................. 708/709, 627, 700, 207
See application file for complete search history.

(56) References Cited

U.S. PATENT DOCUMENTS

| | | | |
|---|---|---|---|
| 5,880,979 A | 3/1999 | Mennemeier et al. | |
| 5,991,785 A * | 11/1999 | Alidina et al. | 708/207 |
| 6,104,836 A | 8/2000 | Buckley et al. | |
| 6,330,581 B1 * | 12/2001 | Hale | 708/709 |
| 6,377,970 B1 | 4/2002 | Abdallah et al. | |
| 7,873,815 B2 * | 1/2011 | Sih et al. | 712/221 |
| 8,019,805 B1 * | 9/2011 | Sarma | 708/627 |
| 8,051,116 B2 | 11/2011 | Johnson et al. | |
| 8,386,545 B2 * | 2/2013 | Stortz et al. | 708/201 |

* cited by examiner

*Primary Examiner* — Tammara Peyton
(74) *Attorney, Agent, or Firm* — Gary Stanford; James W. Huffman

(57) ABSTRACT

A system for fast determination of a horizontal minimum of multiple digital values including a difference circuit and a compare circuit. The difference circuit may include first and second adders in which the first adder compares upper bits of a first digital value with upper bits of a second digital value and provides a first carry output and a propagate output. The second adder compares lower bits of the first digital value with lower bits of the second digital value and provides a second carry output. The compare circuit determines whether the first digital value is greater than the second digital value based on the carry and propagate outputs. Multiple difference circuits may be used to compare each of multiple digital values with every other digital value to provide corresponding compare bits, which are then used to determine a minimum one of the digital values and its corresponding location.

19 Claims, 6 Drawing Sheets

FOR PMIN:
    AL<31:0> = ABUS<31:0> = A3, A2, A1, A0 = W1, W0
    AH<31:0> = ABUS<95:64> = A11, A10, A9, A8 = W6, W5
    BL<55:0> = 0X8, ABUS<63:16> = 0, A7, A6, A5, A4, A3, A2 = 0, W3, W2, W1
    BH<55:0> = 0X8, ABUS<127:79> = 0, A15, A14, A13, A12, A11, A10 = 0, W7, W6, W5
FOR PSAD:
    AL<31:0> = ABUS<31:0> = A3, A2, A1, A0
    AH<31:0> = ABUS<31:0> = A3, A2, A1, A0
    BL<55:0> = BBUS<55:0> = B6, B5, B4, B3, B2, B1, B0
    BH<55:0> = BBUS<87:32> = B10, B9, B8, B7, B6, B5, B4

SYSTEM AND METHOD FOR DETERMINATION OF A HORIZONTAL MINIMUM OF DIGITAL VALUES

CROSS-REFERENCE TO RELATED APPLICATIONS

This application is related to co-pending U.S. patent application Ser. No. 12/605,753, filed concurrently herewith entitled SYSTEM AND METHOD OF USING COMMON ADDER CIRCUITRY FOR BOTH A HORIZONTAL MINIMUM INSTRUCTION AND A SUM OF ABSOLUTE DIFFERENCES INSTRUCTION, which has a common assignee and which has common inventors.

BACKGROUND OF THE INVENTION

1. Field of the Invention

The present invention relates to microprocessor instructions, and more particularly, to a system and method for determination of the minimum one of a set of digital values, otherwise referred to as a horizontal minimum.

2. Description of the Related Art

Modern day microprocessors are often configured to perform media instructions to improve the efficiency of multimedia applications and the like. For example, one or more media instructions may be included in the microprocessor architecture to identify a horizontal minimum, which is the minimum one of a set of digital values and its corresponding location in a bus or register or the like. A specific example is the PHMINPOSUW instruction described in the SSE4 Programming Reference manual by Intel®, which determines the location of the minimum 16-bit word of a set of eight unsigned words (128 bits). Certain conventional microprocessors require multiple processing or clock cycles to perform the PHMINPOSUW instruction. As an example, a group of four 16-bit magnitude comparators may be used to identify minimum ones of corresponding pairs of words to reduce the search from 8 to 4 words in a first cycle, the results are fed back to two of the comparators to further reduce the search to two words in a second cycle, and the results are fed back to one of the comparators to find the ultimate minimum word of the set of digital values in the third and last cycle. Alternatively, it is possible to perform the instruction in a single cycle using an increased number of fast 16-bit comparators. As an example, seven fast 16-bit comparators are included in which the first four comparators perform the first comparison of corresponding pairs to reduce the search from 8 to 4 words, the second pair of comparators reduce the search to two words, and the last comparator performs the final comparison to provide the final result in a single cycle. Each 16-bit comparator, however, consumes a significant amount of space on the microprocessor die thereby increasing cost and reducing overall processing efficiency.

There is a need to identify the minimum one of a set of digital values and its corresponding location in a bus or register or the like in a single cycle without a significant increase in circuitry.

SUMMARY OF THE INVENTION

A system for determining a minimum one of at least two binary values according to one embodiment includes first and second adders and a compare circuit. The first adder adds upper bits of a first binary value with inverted upper bits of a second binary value and provides a first carry output and a first propagate output. The second adder adds lower bits of the first binary value with inverted lower bits of the second binary value and provides a second carry output. The compare circuit determines whether the first binary value is greater than the second binary value based on the first and second carry outs and the first propagate output. The first and second binary values may be unsigned. The adders may each perform unsigned binary addition. The propagate output indicates whether a carry input would be propagated through the first adder.

A system for fast determination of a horizontal minimum of multiple digital values may include multiple difference circuits, a routing circuit, and a compare circuit. Each difference circuit compares two digital values and the routing circuit routes each digital value to at least one difference circuit in order to compare each digital value with every other digital value. Each difference circuit may include an upper adder and a lower adder. The upper adder compares an upper portion of a first digital value with an upper portion of a second digital value and provides a corresponding one of multiple first carry outputs and a corresponding one of multiple propagate outputs. The lower adder compares a lower portion of the first digital value with a lower portion of the second digital value and provides a corresponding one of multiple second carry outs. A compare circuit combines the first and second carry outputs and the propagate outputs to determine a minimum one of the digital values.

Each propagate output indicates whether a carry input would be propagated through an upper adder of a corresponding difference circuit. The compare circuit may be configured to decode comparison bits to provide minimum bits in which each minimum bit identifies whether a corresponding digital value is a lesser value. A location circuit may be provided to identify a location of the minimum digital value in a memory. The system may be integrated on a microprocessor chip for performing a fast horizontal minimum instruction.

A method of determining a minimum one of multiple digital values according to one embodiment includes comparing upper bits of a first digital value with upper bits of a second digital value and providing a first carry output and a propagate output, comparing lower bits of the first digital value with lower bits of the second digital value and providing a second carry output, and determining which of the first and second digital values is a lesser value based on the first and second carry outputs and the propagate output. The method may include routing each of multiple digital values to at least one of multiple adder pairs for comparing each digital value with every other digital value, and determining a minimum digital value. The method may include decoding compare bits. The method may include determining a memory location of the minimum digital value stored within a memory.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present inventors have observed that a horizontal minimum instruction for a conventional microprocessor consumes multiple cycles. The present inventors have determined that it would be possible to perform the same instruction in only one cycle, but without a significant increase in circuitry as would be the case using conventional methods. The present inventors have therefore developed a system and method for fast determination of the horizontal minimum, as will be further described below with respect to FIGS. 1-8.

Figure 1:
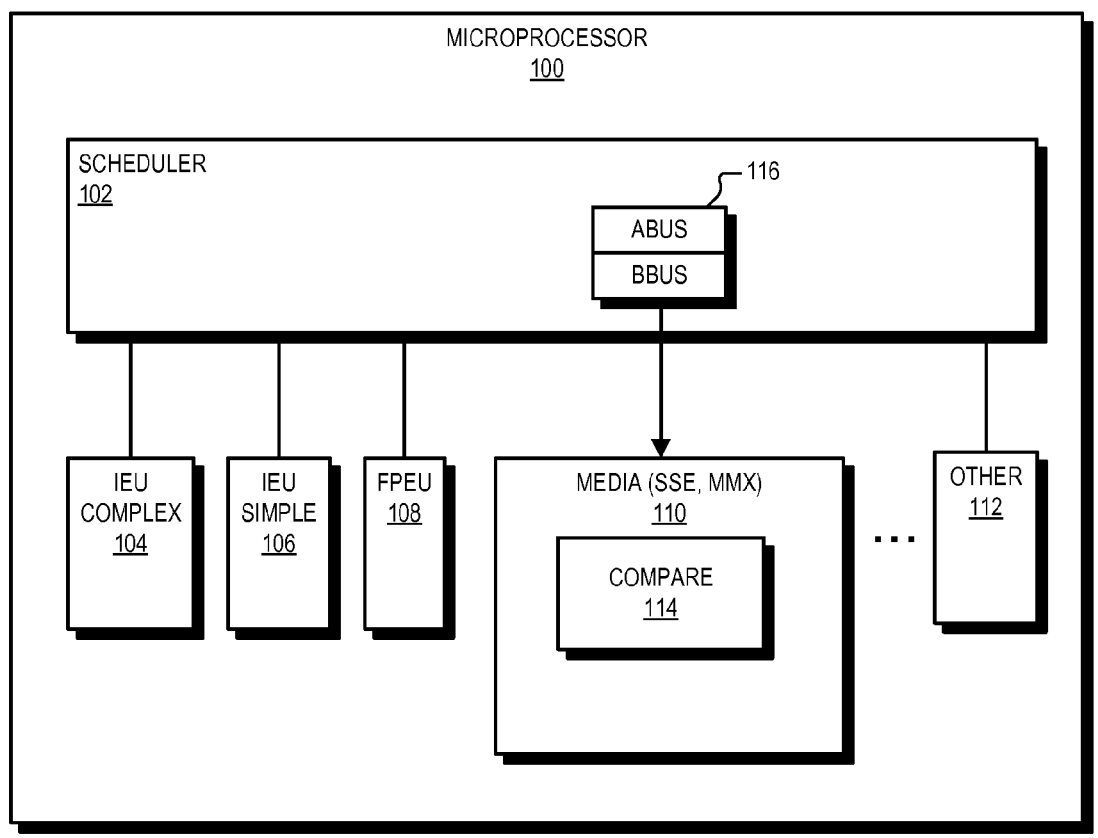
FIG. 1 is a simplified block diagram of a microprocessor including a compare circuit which performs fast determination of a horizontal minimum of a set of digital values according to one embodiment.

FIG. 1 is a simplified block diagram of a microprocessor 100 including a compare circuit 114 according to one embodiment which performs fast determination of a horizontal minimum of a set of digital values and which also performs a sum of absolute differences for first and second sets of digital values. Many systems and functions of typical microprocessors are not shown, such as instruction fetch and queuing, decoding, reordering, etc., as not necessary for a full and complete understanding of the present invention. The microprocessor 100 includes a scheduler 102 which routes instructions or operations to selected ones of several Arithmetic Logic Units (ALUs) or execution units (EUs). As shown, the scheduler 102 is coupled to a complex integer execution unit (IEU) 104, a simple IEU 106, a floating point EU (FPEU) 108, a media unit 110, among other possible similar or different processing units, generally shown as an other unit 112. The media unit 110 generally performs media-based instructions and operations, such as Streaming SIMD Extensions (SSE) which is a Single Instruction, Multiple Data (SIMD) instruction set extension to the x86 architecture by Intel®, or MultiMedia extension (MMX) by Intel®, or the like. The media unit 110 includes the compare circuit 114 which is configured to perform at least two separate media instructions referred to herein as PSAD and PMIN. The PSAD instruction, when indicated, sums the absolute differences of a first set of digital or binary values with sequential groups of a second set of digital or binary values as further described below. The PMIN instruction, when indicated, provides the value and location of the minimum one of a set of digital values as further described below. The terms "binary value" and "digital value" and corresponding forms are used interchangeably herein and generally refer to values represented by multiple bits or hexadecimal values or the like. The scheduler 102 includes memory 116 with a first bus ABUS and a second bus BBUS for storing operands for the PSAD and PMIN instructions. In one embodiment, ABUS and BBUS each include 128 bits, although any number of bits are contemplated. Although the media unit 110 is typically configured to perform various other media instructions as understood by those skilled in the art, only the compare circuit 114 for performing the PSAD and PMIN instructions is shown and described herein.

In one embodiment, the first set of digital values for the PSAD instruction includes four unsigned bytes (8 bits each) and the second set of digital values includes a sequential set of 11 bytes which are grouped four at a time. For the second set of digital values, each next four byte group starts at the next higher byte, meaning that each next group is shifted one byte thus overlapping the last group by three bytes. The absolute differences are determined for each byte between the first set of digital values and each sequential group of the second set of digital values, and the differences are summed together. A more specific example is the MPSADBW instruction described in the SSE4 Programming Reference manual by Intel®. For the PSAD instruction, the ABUS carries the first operand which includes 4 unsigned bytes, and the BBUS carries the second operand which includes 11 unsigned bytes. The sums of absolute differences are provided as eight 10-bit unsigned binary values. The PSAD instruction may include one or more offsets for locating the operands. For purposes of this disclosure any such offsets are either applied prior to placement in the ABUS and BBUS so that the relevant operand values are located beginning at the right-most bit position within ABUS and BBUS, or such offsets are ignored as not being relevant to the present invention. In one embodiment, the PMIN instruction provides the 16-bit value and corresponding location of the minimum one of a set of 8 unsigned digital words (16 bits) in the ABUS. A more specific example is the PHMINPOSUW instruction described in the SSE4 Programming Reference manual by Intel®. For the PMIN instruction, the ABUS carries eight 16-bit words and the BBUS is either undefined or "don't care" or is a copy of the ABUS. As described herein, the compare circuit 114 enables both instructions to be performed in a single cycle using common adder circuitry which is used for both instructions.

Figure 2:
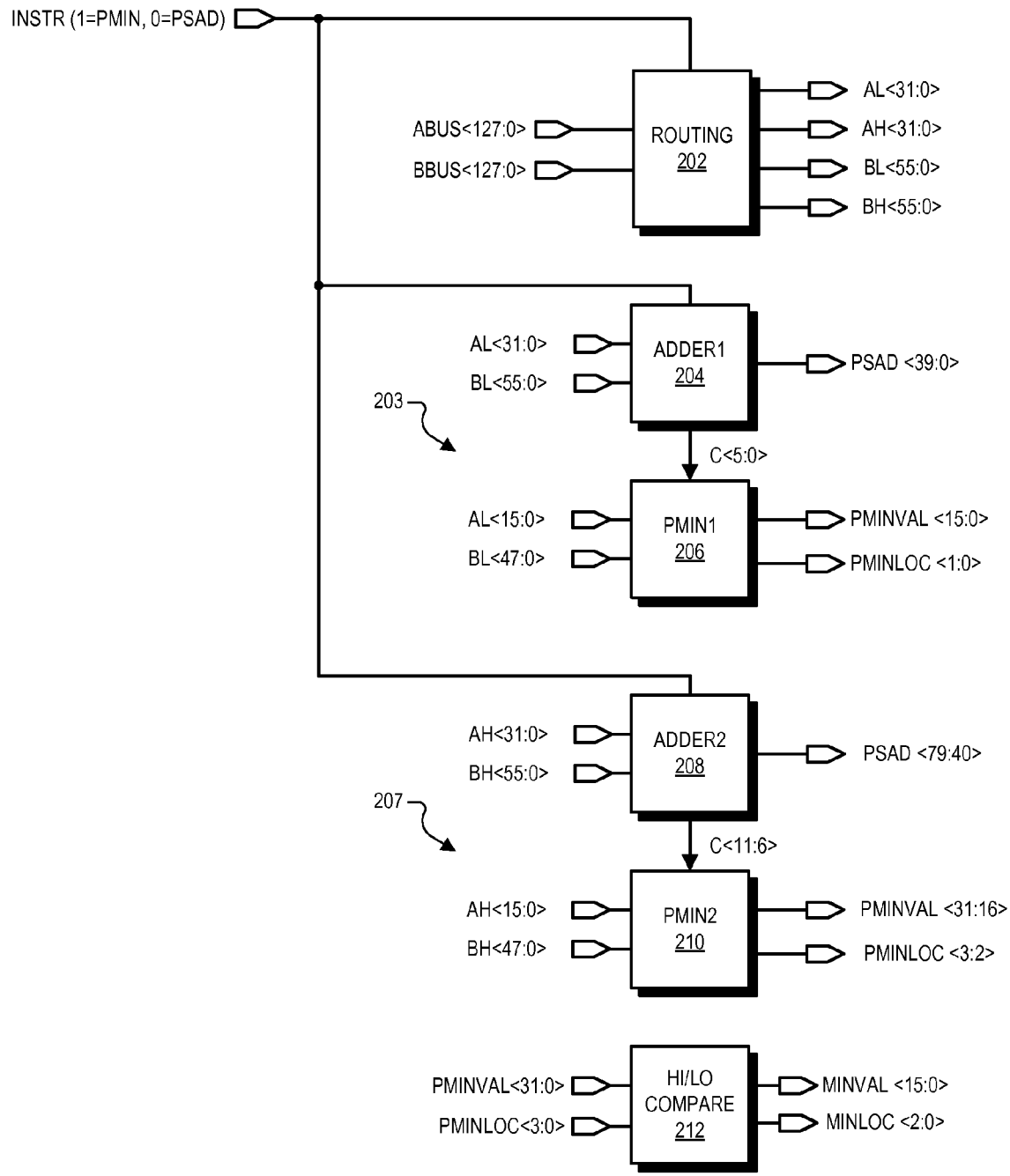
FIG. 2 is a block diagram of the compare circuit of FIG. 1 according to an exemplary embodiment.

FIG. 2 is a block diagram of the compare circuit 114 according to an exemplary embodiment including a routing circuit 202, a low-order (LO) adder circuit 203, a high-order (HI) adder circuit 207, and a HI/LO comparator circuit 212. The routing circuit 202 has respective inputs coupled to the ABUS and BBUS and reorders or re-routes respective bytes from the ABUS and BBUS to appropriate byte locations of separate A and B buses based on the instruction being performed, which is determined by at least one bit of a control value INSTR provided to another input of the routing circuit 202. In the illustrated embodiment, INSTR=1 to indicate PMIN and INSTR=0 to indicate PSAD. The A bus is divided into a 32-bit high portion AH<31:0> and a 32-bit low portion AL<31:0> and the B bus is similarly divided into a 56-bit high portion BH<55:0> and a 56-bit low portion BL<55:0>. The particular byte ordering or routing depends on the instruction being performed as described further below. The LO adder circuit 203 includes a first adder (ADDER1) circuit 204 coupled to a first PMIN (PMIN1) circuit 206 and the HI adder circuit 207 includes a second adder (ADDER2) circuit 208 coupled to a second PMIN (PMIN2) circuit 210.

The INSTR value, AL<31:0> and BL<55:0> are provided to corresponding inputs of the ADDER1 circuit 204, which outputs a 40-bit sum of absolute differences value PSAD<39:0> and 6 comparison bits C<5:0>. The comparison bits C<5:0>, AL<15:0> and BL<47:0> are provided as inputs to the PMIN1 circuit 206, which outputs a minimum value PMINVAL<15:0> and corresponding location PMINLOC<1:0> for the lower portion. The INSTR value, AH<31:0> and BH<55:0> are provided to inputs of the ADDER2 circuit 208, which outputs a 40-bit sum of absolute differences value PSAD<79:40> and 6 comparison bits C<11:6>. The comparison bits C<11:6>, AH<15:0> and BH<47:0> are provided as inputs to the PMIN2 circuit 210, which outputs a minimum value PMINVAL<31:16> and corresponding location PMINLOC<3:2> for the upper portion. The PMINVAL<15:0> and PMINLOC<1:0> bits from the ADDER1 circuit 206 and the PMINVAL<31:16> and PMINLOC<3:2> bits from the ADDER1 circuit 206 are combined as the PMINVAL<31:0> and PMINLOC<3:0> bits provided to respective inputs of the HI/LO compare circuit 212, which outputs the final minimum digital value on bits MINVAL<15:0> and corresponding location bits MINLOC<2:0>.

The ADDER1 and ADDER2 circuits 204 and 206 arrange input bytes and perform byte by byte comparisons according to the instruction indicated by INSTR. For the PSAD instruction, the combined PSAD<79:0> bits includes eight 10-bit unsigned digital values as a result of the sum of absolute difference operations. For PSAD, the operations and outputs of the PMIN1 and PMIN2 circuits 206 and 210 and the HI/LO compare circuit 212 are ignored. For the PMIN instruction, the PSAD<79:0> bits are ignored and instead the compare bits C<11:0> are used by the PMIN1 and PMIN2 circuits 206 and 210 for determining minimum digital values and corresponding locations for each of the HI and LO portions of the input operand. The HI/LO compare circuit 212 receives and compares the corresponding minimum digital values of the HI and LO portions and outputs the minimum value MINVAL<15:0> and corresponding location MINLOC<2:0> for the entire 128-bit input of the ABUS.

Figure 3:
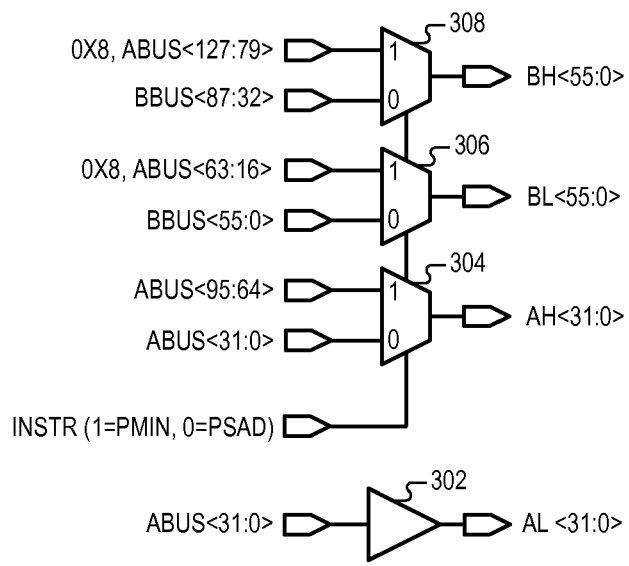
FIG. 3 is a schematic diagram of the routing circuit of FIG. 2 according to an exemplary embodiment.

FIG. 3 is a schematic diagram of the routing circuit 202 according to an exemplary embodiment. The routing circuit 202 is configured order or route digital values from ABUS/BBUS to the A and B buses according to the particular instruction indicated. A buffer circuit 302 receives ABUS<31:0> at its input and outputs the corresponding AL<31:0> bits for both PSAD and PMIN instructions. In one embodiment, the buffer circuit 302 includes a separate buffer for each bit so that the ABUS<31:0> bits are effectively copied over as the AL<31:0> bits, or AL<31>=ABUS<31>, AL<30>=ABUS<30>, . . . , AL<0>=ABUS<0>. The AL<31:0> bits include four bytes A3, A2, A1 and A0 for both PSAD and PMIN. It is noted that the bytes A3-A0 are conceptually paired as 16-bit words W1 (A3, A2) and W0 (A1, A0) for PMIN. A multiplexer (MUX) 304 receives the ABUS<95:64> bits at its logic one (1) or logic high input and receives the ABUS<31:0> bits at its logic zero (0) or logic low input and outputs the AH<31:0> bits. In one embodiment, a separate 1-bit wide MUX may be provided for each of the 32 bits AH<31:0> so that a separate MUX path is provided for each of the inputs and the output. If INSTR indicates PMIN, then the ABUS<95:64> bits are selected by the MUX 304 as the output AH<31:0>. These 32 bits form four bytes A11, A10, A9, and A8, which are paired as words W5 (A11, A10) and W4 (A9, A8) for PMIN. If INSTR indicates PSAD, then the ABUS<31:0> bits are again selected as AH<31:0> including the same four bytes A3-A0. The duplication of bytes is because the first operand for the PSAD instruction remains the same for the HI and LO portions as further described below.

Another MUX 306 receives 8 upper logic 0 pad bits (0x8) and the ABUS<63:16> bits at its logic 1 input, receives the BBUS<55:0> bits at its logic 0 input, and outputs the BL<55:0> bits. In one embodiment, a separate 1-bit wide MUX may be provided for each bit of each bus. If INSTR indicates PMIN, then the ABUS<63:16> bits are selected which includes six bytes A7, A6, A5, A4, A3, and A2, which are paired as words W3 (A7, A6), W2 (A5, A4) and W1 (A3, A2) for PMIN. If INSTR indicates PSAD, then the BBUS<55:0> bits includes the lower seven bytes B6, B5, B4, B3, B2, B1 and B0 of the second operand of the PSAD instruction. Another MUX 308 receives 8 upper logic 0 pad bits (0x8) and the ABUS<127:79> bits at its logic 1 input, receives the BBUS<87:32> bits at its logic 0 input, and outputs the BH<55:0> bits. If INSTR indicates PMIN, then the ABUS<127:79> bits are selected including six bytes A15, A14, A13, A12, A11, and A10 paired as words W7 (A15, A14), W6 (A13, A12) and W5 (A11, A10). If INSTR indicates PSAD, then the BBUS<87:32> bits includes the upper seven bytes B10, B9, B8, B7, B6, B5 and B4 of the second operand of the PSAD instruction.

Referring back to FIG. 2 while employing the byte assignments of the routing circuit 202 as shown in FIG. 3, the words W1 and W0 are provided on the AL bus and the words W3, W2 and W1 are provided on the BL bus to the ADDER1 circuit 204 for PMIN. As described further below, the ADDER1 circuit 204 compares W0 with each of W1, W2 and W3, compares W1 with each of W2 and W3, and compares W2 with W3 and provides the corresponding comparison bits C<5:0>. The PMIN1 circuit 206 receives the words W3-W0 and asserts the corresponding bits of the minimum word as PMINVAL<15:0>. The PMIN1 circuit 206 also indicates the relative location of the minimum word within the lower half of ABUS bus on the PMINLOC<1:0> bits. For example, PMINLOC=00 if the minimum word is located at ABUS<15:0>, PMINLOC=01 if the minimum word is located at ABUS<32:16>, etc. In a similar manner, the words W5 and W4 are provided on the AH bus and the words W7, W6 and W5 are provided on the BH bus to the ADDER2 circuit 208 for PMIN. As described further below, the ADDER2 circuit 208 compares W4 with each of W5, W6 and W7, compares W5 with each of W6 and W7, and compares W6 with W7 and provides the corresponding comparison bits C<11:6>. The PMIN2 circuit 210 receives the words W7-W4 and asserts the corresponding bits of the minimum word as PMINVAL<31:16>. The PMIN2 circuit 210 also indicates the relative location of the minimum word within the upper half of ABUS bus on the PMINLOC<3:2> bits. For example, PMINLOC=00 if the minimum word is located at ABUS<79:64>, PMINLOC=01 if the minimum word is located at ABUS<95:65>, etc. The HI/LO compare circuit 212 compares the word provided on PMINVAL<15:0> with the word provided on PMINVAL<31:16> to identify which is the minimum value within ABUS<127:0>. The location bits MINLOC<2:0> are also determined based on this comparison.

Referring back to FIG. 2 while employing the byte assignments of the routing circuit 202 as shown in FIG. 3, the bytes A3-A0 of the first operand from the ABUS are provided on both AL<31:0> and AH<31:0> and thus to both the ADDER1 circuit 204 and the ADDER2 circuit 208 for PSAD. The bytes B6-B0 of the second operand from the BBUS are provided on BL<55:0> to the ADDER1 circuit 204 and the bytes B10-B4 of the second operand from the BBUS are provided on BH<55:0> to the ADDER2 circuit 208. For PSAD, the ADDER1 circuit 204 sums the differences of byte pairs A0&B0, A1&B1, A2&B2, and A3&B3 and provides a first 10-bit result PSAD<9:0>, sums the differences of byte pairs A0&B1, A1&B2, A2&B3, and A3&B4 and provides a second 10-bit result PSAD<19:10>, sums the differences of byte pairs A0&B2, A1&B3, A2&B4, and A3&B5 and provides a third 10-bit result PSAD<29:20>, and sums the differences of byte pairs A0&B3, A1&B4, A2&B5, and A3&B6 and provides a fourth 10-bit result PSAD<39:30>. In a similar manner, the ADDER2 circuit 208 sums the differences of byte pairs A0-B4, A1-B5, A2-B6, and A3-B7 and provides a first 10-bit result PSAD<49:40>, sums the differences of byte pairs A0&B5, A1&B6, A2&B7, and A3&B8 and provides a second 10-bit result PSAD<59:50>, sums the differences of byte pairs A0&B6, A1&B7, A2&B8, and A3&B9 and provides a third 10-bit result PSAD<69:60>, and sums the differences of byte pairs A0&B7, A1&B8, A2&B9, and A3&B10 and provides a fourth 10-bit result PSAD<79:70>.

Figure 4:
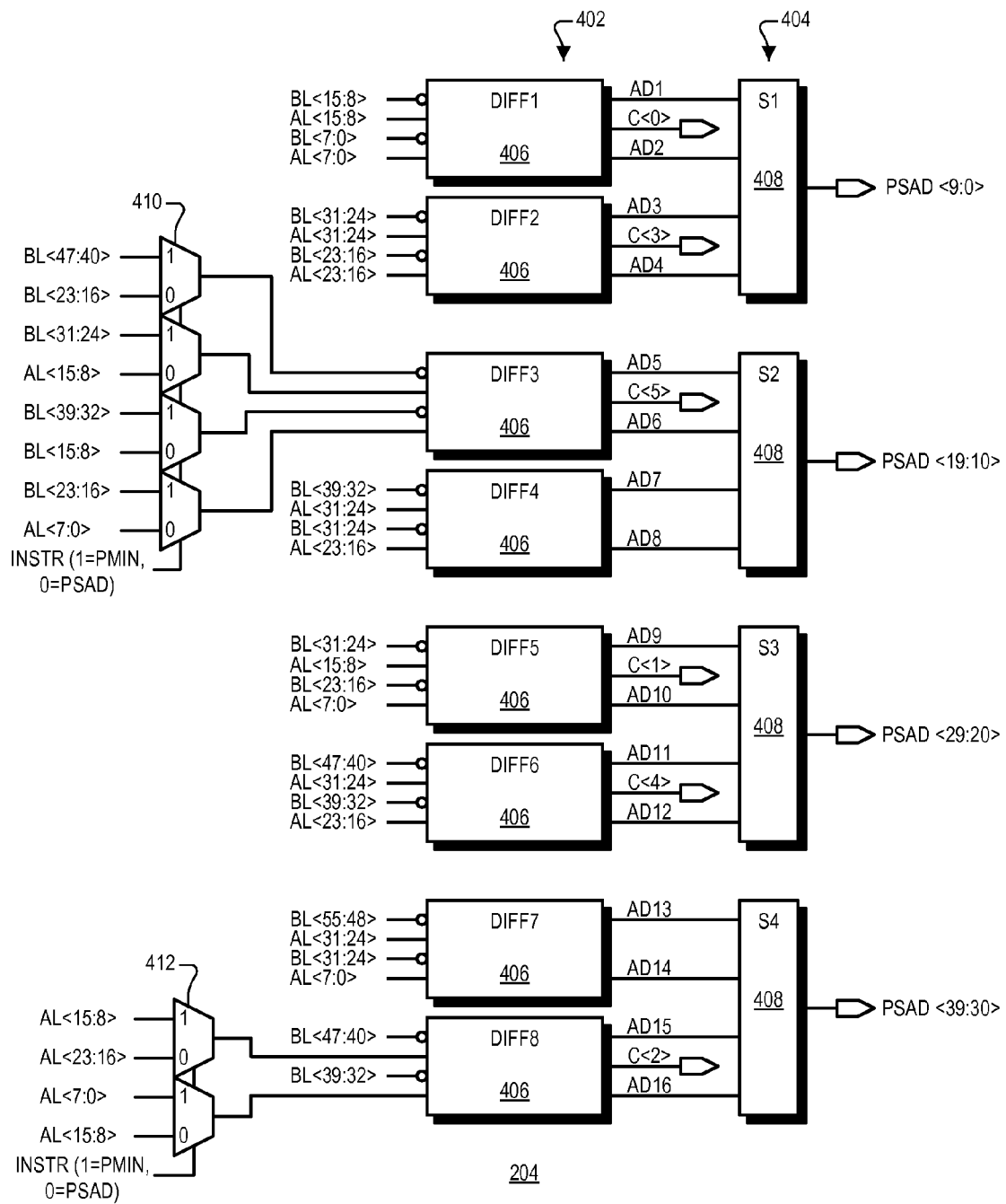
FIG. 4 is a schematic and block diagram of the ADDER1 circuit of FIG. 2 according to an exemplary embodiment.

FIG. 4 is a schematic and block diagram of the ADDER1 circuit 204 according to an exemplary embodiment for processing the bytes of AL<31:0> and BL<31:0> and providing PSAD<39:0> or C<5:0>. The ADDER1 circuit 204 includes a difference circuit 402 and a sum circuit 404 along with selection logic 410 and 412. The difference circuit 402 includes a series of individual difference circuits 406, individually labeled DIFF1, DIFF2, . . . , DIFF8 (DIFF1-DIFF8), and the sum circuit 404 includes a series of individual sum circuits 408, individually labeled S1, S2, S3 and S4 (S1-S4). Each of the difference circuits 406 determines an unsigned difference between two pairs of bytes by inverting one byte of each pair and then performing an unsigned addition for each pair. The result is the absolute value of the difference between the two bytes for each pair. The groupings of the particular bytes of pair for each difference circuit 406 depends upon the instruction being performed. The selection logic 410 includes individual MUX circuits for selecting between bytes for the third difference circuit DIFF3 406 depending upon the instruction being performed. As shown, the selection logic 410 includes logic 1 inputs for selecting bytes BL<47:40>, BL<31:24>, BL<39:32> and BL<23:16> corresponding to bytes A7, A5, A6 and A4, respectively, for the PMIN instruction, and includes logic 0 inputs for selecting bytes BL<23:16>, AL<15:8>, BL<15:8> and AL<7:0> corresponding to bytes B2, A1, B1 and A0, respectively, for the PSAD instruction. In a similar manner, the selection logic 412 includes logic 1 inputs for selecting bytes AL<15:8> and AL<7:0> corresponding to bytes A1 and A0 for the PMIN instruction, and includes logic 0 inputs for selecting bytes AL<23:16> and AL<15:8> corresponding to bytes A2 and A1, respectively, for the PSAD instruction.

For PSAD, the first difference circuit DIFF1 406 receives bits BL<15:8> at a first inverted input which corresponds with byte B1 and receives bits AL<15:8> at its second non-inverted input which corresponds with byte A1. The first difference circuit DIFF1 406 determines the absolute value of the difference A1−B1 (|A1−B1|) and provides the result as AD1 at a first output. In a similar manner, the first difference circuit DIFF1 406 receives bits BL<7:0> at a third inverted input which corresponds with byte B0 and receives bits AL<7:0> at its fourth non-inverted input which corresponds with byte A0. The first difference circuit DIFF1 406 determines the absolute value of the difference A0−B0 (|A0−B0|) and provides the result as AD2 at a second output. In a similar manner, the second difference circuit DIFF2 406 determines the absolute value of A3−B3 (|A3−B3|) and provides the result as AD3 at a first output and determines the absolute value of A2−B2 (|A2−B2|) and provides the result as AD4 at a second output. As a whole, the difference circuit 402 determines the absolute difference of byte A0 with each of bytes B0-B3, of byte A1 with each of bytes B1-B4, of byte A2 with each of bytes B2-B5, and of byte A3 with each of bytes B3-B6 when the PSAD instruction is indicated by INSTR.

The first sum circuit S1 408 determines the sum of the four bytes AD1+AD2+AD3+AD4 and provides the result as the 10-bit value PSAD<9:0>. This sum corresponds to the sum of the absolute differences of A0&B0, A1&B1, A2&B2 and A3&B3. For PSAD, the third difference circuit DIFF3 406 determines the absolute values of the differences of A0&B1 for AD6 and A1&B2 for AD5 and the fourth difference circuit DIFF4 406 determines the absolute values of the differences A2&B3 for AD8 and A3&B4 for AD7. The second sum circuit S2 408 determines the sum of the four bytes AD5+AD6+AD7+AD8 and provides the result as the 10-bit sum of absolute differences value PSAD<19:10> which corresponds to the sum of absolute differences of A0&B1, A1&B2, A2&B3, and A3&B4. In a similar manner for PSAD, the third sum circuit S3 408 determines the sum of the four bytes AD9+AD10+AD11+AD12 and provides the result as the 10-bit value PSAD<29:20> which corresponds to the sum of the absolute differences of A0&B2, A1&B3, A2&B4 and A3&B5. Finally for PSAD, the fourth sum circuit S4 408 determines the sum of the four bytes AD13+AD14+AD15+AD16 and provides the result as the 10-bit value PSAD<39:30> which corresponds to the sum of the absolute differences of A0&B3, A1&B4, A2&B5 and A3&B6. Although the particular details are not shown, the ADDER2 circuit 208 is configured in substantially identical manner as the ADDER1 circuit 204 for determining the absolute values of the differences of byte A0 with each of bytes B4-B7, for determining the absolute values of the differences of byte A1 with each of bytes B5-B8, for determining the absolute values of the differences of byte A2 with each of bytes B6-B9, and for determining the absolute values of the differences of byte A3 with each of bytes B7-B10. Further, the ADDER2 circuit 208 sums appropriate groups of four absolute difference values for providing the four sum values contained within PSAD<79:40>.

In summary, for the PSAD instruction, the difference circuit 402 is used to determine an absolute difference between each byte of the first set of digital values A3:A0 with a corresponding byte of each of sequential groups of digital values of the second set of digital values B10:B0. After the first group B3:B0, each following group starts at the next higher byte of the second set of digital values, i.e., B1:B4, B2:B5, B3:B6, etc. This results in 8 groups of absolute difference values AD1-AD4, AD5-AD8, . . . , AD28-AD32. The sum circuit 404 sums each group of absolute difference values to provide the corresponding sums of absolute differences values PSAD<79:0>.

When the PMIN instruction is indicated by INSTR, the difference circuit 402 determines the absolute value of the differences of byte pairs in substantially identical manner except with different byte assignments for PMIN. The sum values AD1-AD16 and PSAD<39:0> are ignored and only the comparison bits C<5:0> are used. The first difference circuit DIFF1 406 compares, or otherwise determines the absolute value of the differences of A1&A3 and A0&A2, where the first byte A3 is the upper byte of word W1 and the second byte A1 is the upper byte of the word W0. The third byte A2 is the lower byte of word W1 and the fourth byte A0 is the lower byte of word W0. In this manner, the difference circuit DIFF1 406 compares the upper and lower bytes of words W1 and W0 with the upper and lower bytes, respectively, of the same words W1 and W0. The difference circuit DIFF1 406 determines the comparison bit C<0> which identifies which of the words W1 and W0 is the lesser of the two words. In a similar manner, the second difference circuit DIFF2 406 compares the upper bytes A5 and A3 and the lower bytes A4 and A2 of the words W2 and W1 to determine the lesser of the two words and determines the comparison bit C<3> accordingly. In a similar manner, the third difference circuit DIFF3 406 compares the upper bytes A7 and A5 and the lower bytes A6 and A4 of the words W3 and W2 to determine the lesser of the two words and determines the comparison bit C<5> accordingly. The results of the fourth difference circuit DIFF4 406 are ignored for PMIN. The fifth difference circuit DIFF5 406 compares the upper bytes A5 and A1 and the lower bytes A4 and A0 of the words W2 and W0 to determine the lesser of the two words and determines the comparison bit C<1> accordingly. The sixth difference circuit DIFF6 406 compares the upper bytes A7 and A3 and the lower bytes A6 and A2 of the words W3 and W1 to determine the lesser of the two words and determines the comparison bit C<4> accordingly. The results of the seventh difference circuit DIFF7 406 are ignored for PMIN. The eighth difference circuit DIFF8 406 compares the upper bytes A7 and A3 and the lower bytes A6 and A2 of the words W3 and W0 to determine the lesser of the two words and determines the comparison bit C<2> accordingly.

In summary of operation of the difference circuit 402 of the ADDER1 circuit 204 for PMIN, the comparison bit C<0> identifies the lesser of words W0 and W1, the comparison bit C<1> identifies the lesser of words W0 and W2, the comparison bit C<2> identifies the lesser of words W0 and W3, the comparison bit C<3> identifies the lesser of words W1 and W2, the comparison bit C<4> identifies the lesser of words W1 and W3, and the comparison bit C<5> identifies the lesser of words W2 and W3. Although the specific details are not explicitly shown, the ADDER2 circuit 208 includes a similar difference circuit which performs substantially similar comparisons for the words W4-W8 of the HI adder circuit 207 to provide the corresponding comparison bits C<11:6>. Thus, for PMIN, the comparison bit C<6> identifies the lesser of words W4 and W5, the comparison bit C<7> identifies the lesser of words W4 and W6, the comparison bit C<8> identifies the lesser of words W4 and W7, the comparison bit C<9> identifies the lesser of words W5 and W6, the comparison bit C<10> identifies the lesser of words W5 and W7, and the comparison bit C<11> identifies the lesser of words W6 and W7. As described further below, the first PMIN1 circuit 206 uses the comparison bits C<5:0> to identify the minimum one of words W0-W3 and the second PMIN2 circuit 210 uses the comparison bits C<11:6> to identify the minimum one of words W4-W7.

Figure 5:
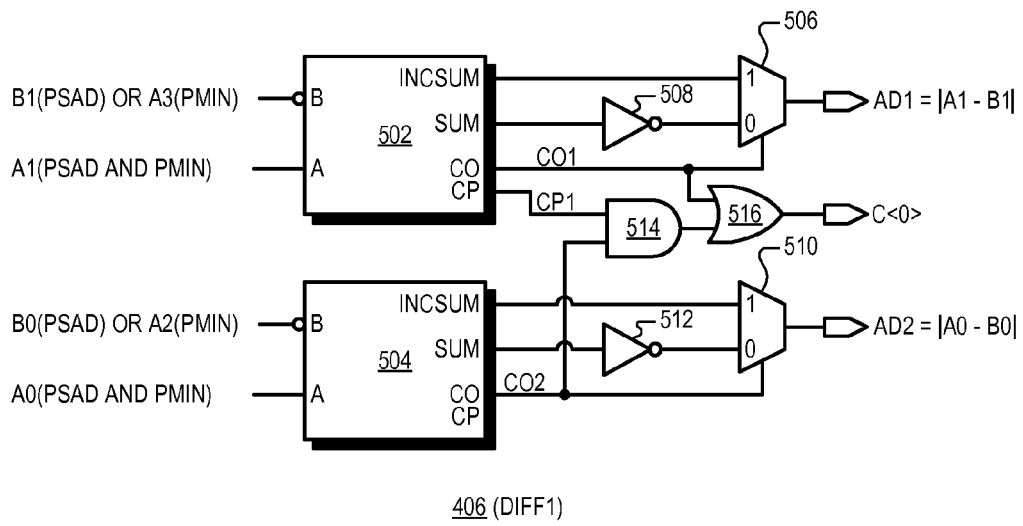
FIG. 5 is a block and schematic diagram of the first difference circuit of FIG. 4 according to an exemplary embodiment.

FIG. 5 is a block and schematic diagram of the first difference circuit DIFF1 406 according to an exemplary embodiment. The difference circuit DIFF1 406 includes an adder pair including an upper or first adder 502 and a lower or second adder 504. Each adder 502 and 504 has an inverted B input and an A input, so that each adder performs a subtraction operation determining a difference between its A and B inputs. Byte B1 (for PSAD) or byte A3 (for PMIN) is provided to the inverted B input of the adder 502, and byte A1 is provided to the A input of the adder 502 for both PSAD and PMIN. The adder 502 inverts each bit of the byte provided to the inverted B input resulting in a value ~B (in which "~" denotes binary inversion), performs an unsigned add with the byte provided to the A input (or A+~B=A−B), and provides the result to a SUM output. The adder 502 has a carry output (CO) output providing a carry output signal CO1. CO1 is a logic 1 when the result of the difference operation of the adder 502 overflows resulting in a carry output bit. The adder 502 also increments the SUM value and provides the result to an incremented sum output INC SUM of the adder 502. The adder 502 has a propagate output CP which asserts a propagate output signal CP1 to a logic 1 if a carry input (not provided) would have propagated through the adder to the output. Although there is no carry input, CP1 is asserted high if a carry input bit was provided and would have propagated through the adder had it been provided. In one embodiment, the CP output providing CP1 is determined by logically ORing each bit of A with the corresponding bit of ~B and logically ANDing the resulting 8 bits. The SUM output is provided to the input of an inverter 508 (including a separate inverter for each bit of the byte), which has an output provided to the logic 0 input of a MUX 506. The INCSUM output is provided to the logic 1 input of the MUX 506, and CO1 is provided to the select input of the MUX 506. The MUX 506 asserts AD1 as the absolute value of the difference between the digital values provided to the A and B inputs of the adder 502.

In a similar manner, byte B0 (for PSAD) or byte A3 for PMIN is provided to the inverted B input of the adder 504, and byte A0 is provided to the A input of the adder 504 for both PSAD and PMIN. The adder 504 inverts each bit of the byte provided to the inverted B input to the opposite logic value, or ~B, performs an unsigned add with the byte provided to the A input, and provides the INCSUM, SUM and CO outputs in a similar manner as described for the adder 502. The CO output of the adder 504 provides a carry output CO2. If the adder 504 includes a CP output as shown, it is not used or is otherwise ignored. Alternatively, adder 504 does not include a CP output. INCSUM is provided to the logic 1 input of another MUX 510, which provides the value AD2 at its output. The SUM output of the adder 504 is provided to the input of an inverter 512, which provides its output to the logic 0 input of the MUX 510. CO2 is provided to the select input of the MUX 510 and to one input of a two-input OR gate 516, which asserts the comparison bit C<0> at its output. The CP output of the adder 502 is provided to one input of a two-input AND gate 514, which has its other input receiving CO2 from the CO output of the adder 504. The output of the AND gate 514 is coupled to the second input of the OR gate 516.

For both of the adders 502 and 504, if A>B, then CO=1 and INCSUM properly represents the result for the absolute value of the difference between the A and B inputs, or |A−B|. When the adder 502 asserts CO1 as a logic 1, then the OR gate 516 asserts C<0>=1. CP1 from the adder 502 is 0 or 1 depending upon the specific binary values of the A and B inputs when CO1 is a logic 1. The value of CP1 is inconsequential for the determination of C<0>, however, when CO1 is a logic 1 since the OR gate 516 asserts C<0>=1 when CO1=1. As an example, if A is a binary value of 00000100 (decimal equivalent of 4) and B is a binary value of 00000010 (decimal equivalent of 2), then A−B=00000010 (decimal equivalent of 2). The B input is inverted on a bit-by-bit basis, or ~B=11111101. The unsigned addition of A+~B (or A−B) is SUM=00000001 with CO1=1 (and CP1=0). The value of SUM, however, does not reflect the correct output value. The output of the inverter (508 or 512) provides ~SUM=11111110, which is also not the correct output value. The output of INCSUM is 00000001+1=00000010, which is the correct result. Thus, for both of the adders 502 and 504, when A>B, then the output CO=1 so that the corresponding MUX (506 or 510) selects the logic 1 input (INCSUM) as the correct output for the absolute value of A−B.

If A≤B, then the output CO=0 and ~SUM at the output of the corresponding inverter (508 or 512) is selected by the corresponding MUX as the correct output. Whenever A=B, then the correct output is 00000000 which is reflected by either INCSUM or ~SUM, although ~SUM is selected by the embodiment illustrated since CO=0. Also, when A=B, the propagate output CP=1. For example, for A=B=00001111, then A+~B=00001111+11110000=11111111=SUM and CP=1. The inverted value of SUM, or ~SUM, is 00000000 which is the correct output result. INCSUM is 1+11111111 which results in an output of 00000000 which is also correct though not selected. Whenever A<B, then the output CO=0 and ~SUM is selected as the correct result. For example, if A=00000010 and B=00000100, then |A−B|=00000010. In this case, A+~B=00000010+11111011=11111101=SUM. The value ~SUM=00000010 is selected as the correct result since CO=0. In this case, INCSUM=1+11111101=11111111 which is not the correct result.

When INSTR indicates PSAD, the adder 502 determines an absolute difference value AD1=|A1−B1| and the adder 504 determines another absolute difference value AD2=|A0−B0| in accordance with PSAD operation and the compare bit C<0> is ignored. When INSTR indicates PMIN, then if A1>A3, the upper byte of word W0 is greater than the upper byte of W1 so that W0>W1. In this case, C<0>=1 whenever W0>W1 since CO1=1. If instead A3>A1, then CO1 and CP1 provided by the adder 502 are both logic 0 so that C<0>=0 indicating that W0<W1. If A1=A3, then for the adder 502, CO1=0 and CP1=1. In this case, the comparison by the adder 504 of the lower bytes of the corresponding words is used to determine the relative values of W0 and W1. If the upper bytes are equal so that CP1=1 and if A0>A2, then the lower byte of word W0 is greater than the lower byte of W1 so that W0>W1. In this case, CP1 and CO2 are both logic 1 so that C<0>=1. If the upper bytes are equal and if the lower bytes are such that A0≤A2, then CO2 is logic 0 so that C<0>=0. In this case, W0≤W1 and W0 is selected as the minimum value in either case. The remaining difference circuits 406 (or DIFF2-DIFF8) are configured to operate in substantially the same manner for determining the remaining difference values AD3-AD16. The difference circuits DIFF4 and DIFF7, however, may be simplified. In particular, the additional logic receiving the CO and CP outputs for determining a corresponding compare bit C<χ> is unnecessary and may be omitted. Also, the propagate logic for each individual adder may be omitted if desired.

Referring to FIGS. 4 and 5, it is appreciated that a significant amount of common adder circuitry is used for both instructions PMIN and PSAD. In particular, each pair of adders within each of the difference circuits 406 is used for both instructions. Each individual adder circuit is used to determine the absolute value of the difference between the pair of bytes provided at the input for the PSAD instruction. Although the sum of absolute difference outputs for the PSAD instruction are not necessary for the PMIN instruction, the byte comparisons employed by each pair of adders is used to identify the word having the minimum value between the two. Routing and select circuitry is provided to maximize utilization of the same set of adders used for the PSAD instruction to facilitate the PMIN instruction. As shown and described, the adders are grouped into adder pairs for the PMIN instruction in which the upper portion (e.g., bytes) of a pair of digital values (e.g., words) are provided to corresponding inputs of a first adder and the corresponding lower portions (e.g., bytes) of the digital values are provided to a second adder. Both adders are modified to include carry outputs and the upper adder of each pair is modified to include a propagate output. The carry and propagate outputs of each pair of adders are used to determine the minimum of each pair of digital values. The collection of adders used to determine the sum of absolute differences between a first operand of 4 bytes and a second operand of 11 bytes for the PSAD instruction is also used to determine the minimum one of a set of eight words for the PMIN instruction.

Figure 6:
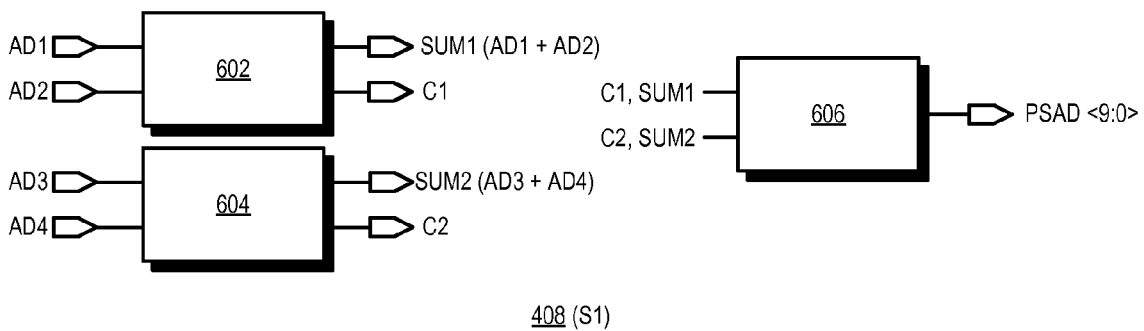
FIG. 6 is a block diagram of the first sum circuit of FIG. 4 according to an exemplary embodiment.

FIG. 6 is a block diagram of the first sum circuit S1 408 according to an exemplary embodiment. The sum circuit S1 408 includes two 8-bit adders 603 and 604 and a 9-bit adder 606 for providing the 10-bit output result PSAD<9:0>. The adders 602 and 604 may be implemented in a similar manner as the adder 502 except that neither of the inputs are inverted, the INCSUM circuitry is unnecessary and may be omitted, and the propagate output circuitry is unnecessary and may be omitted. The adder 602 performs the addition of unsigned binary values AD1 and AD2 to provide a first sum value SUM1=AD1+AD2 and a corresponding carry output C1. The adder 604 performs the addition of unsigned binary values AD3 and AD4 to provide a second sum value SUM2=AD3+AD4 and a corresponding carry output C2. The first carry output C1 is appended as the MSB of SUM1 to provide a first input of the adder 606 and the second carry output C2 is appended as the MSB of SUM2 to provide a second input of the adder 606, in which each input is 9 bits. The adder 606 performs an unsigned addition of C1, SUM1+C2, SUM2 to provide the 10-bit output result PSAD<9:0>. The least significant 9 bits PSAD<8:0> are a result of the unsigned binary addition and the MSB PSAD<9> is a carry output bit as a result of the addition. In this manner, the first sum circuit S1 sums a first group of absolute difference values AD1-AD4 to provide a first sum of absolute differences value PSAD<9:0>. The remaining sum circuits S2-S4 are configured in substantially identical manner, each summing corresponding groups of absolute difference values AD5-AD8, A9-A12, and AD13-AD16 to provide corresponding sums of absolute differences values PSAD<19:10>, PSAD<29:20>, and PSAD<39:30>, respectively.

Figure 7:
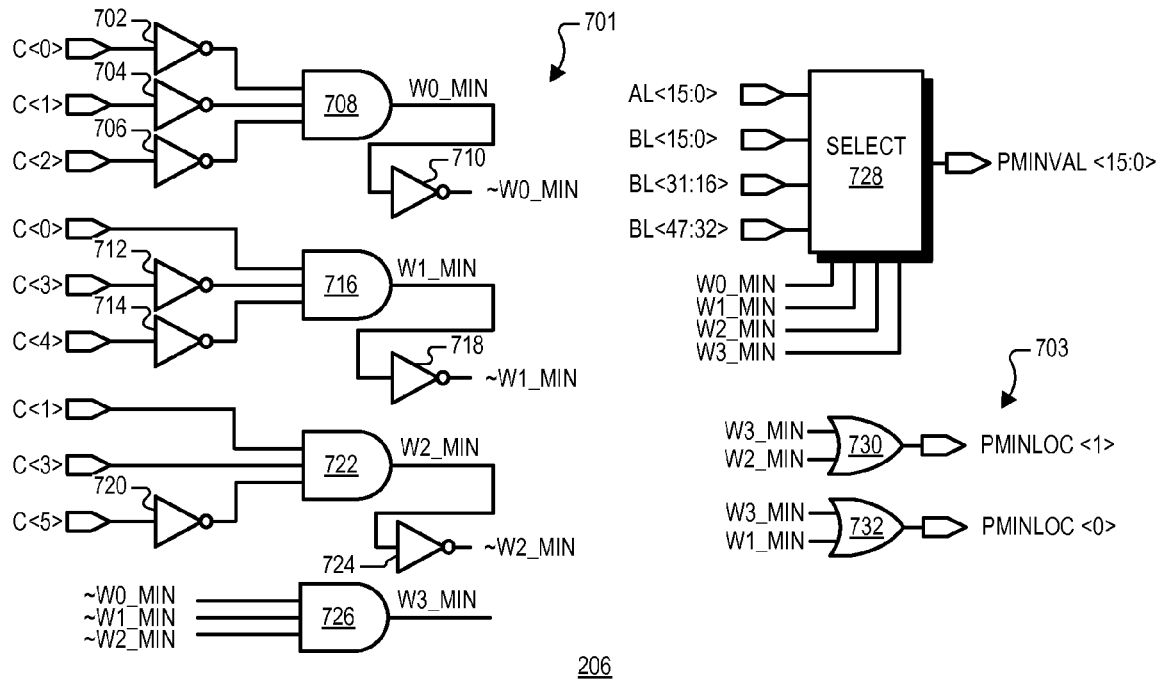
FIG. 7 is a schematic and block diagram of the PMIN1 circuit of FIG. 2 according to an exemplary embodiment.

FIG. 7 is a schematic and block diagram of the PMIN1 circuit 206 according to an exemplary embodiment. The PMIN1 circuit 206 includes decode logic 701, select logic 728, and location logic 703. The decode logic 701 includes inverters 702, 704, 706, 712, 714, 720, 710, 718 and 724 and three-input AND gates 708, 716, 722 and 726. The location logic 703 includes two-input OR gates 730 and 732. The C<2:0> compare bits are each provided to the input of a respective one of inverters 702, 704 and 706, each having an output provided to a respective input of the AND gate 708. The output of the AND gate 708 provides a signal W0_MIN which is asserted as a logic 1 when word W0 is the minimum word. The C<3:4> compare bits are each provided to the input of a respective one of 712 and 714, each having an output provided to a respective input of the AND gate 716. C<0> is provided to the third input of the AND gate 716. The output of the AND gate 716 provides a signal W1_MIN which is asserted as a logic 1 when word W1 is the minimum word. The C<5> compare bit is provided to the input of an inverter 720 having an output provided to a respective input of the AND gate 722. The C<1> and C<3> compare bits are provided to the other two inputs of the AND gate 722. The output of the AND gate 722 provides a signal W2_MIN which is asserted as a logic 1 when word W2 is the minimum word. The W0_MIN, W1_MIN and W2_MIN signals are each provided to the input of a respective one of the inverters 710, 718 and 724, which provide signals ~W0_MIN, ~W1_MIN, and ~W2_MIN, respectively, each indicating that the corresponding word is not the minimum value. The ~W0_MIN, ~W1_MIN, and ~W2_MIN signals are provided to respective inputs of the AND gate 726, having an output providing a signal W3_MIN. W3_MIN is asserted as a logic 1 when word W3 is the minimum word.

AL<15:0>, BL<15:0>, BL<31:16> and BL<47:32>, representing words W0, W1, W2 and W3, respectively, are provided to respective inputs of the select circuit 728. The W0_MIN-W3_MIN signals are provided to respective select inputs of the select circuit 728. Only one of the select signals W0_MIN-W3_MIN is asserted to logic 1 at a time indicating that the corresponding word is the minimum value for the cycle. Thus, the select logic 728 selects one of W0-W3 as the minimum word provided on PMINVAL<15:0> at the output of the select logic 728. W3_MIN and W2_MIN are provided to respective inputs of the OR gate 730 having an output providing the corresponding location bit PMINLOC<1>. W3_MIN and W1_MIN are provided to respective inputs of the OR gate 732 having an output providing the corresponding location bit PMINLOC<0>. In this manner, PMINVAL<15:0> provides the value of the minimum one of words W0-W3 and PMINLOC<1:0> indicates the corresponding location of the minimum word within the lower half of ABUS for the LO adder circuit 203. The PMIN2 circuit 210 is configured in substantially the same manner so that PMINVAL<31:16> provides the value of the minimum one of words W4-W7 and PMINLOC<3:2> indicates the corresponding location of the minimum word within the upper half of ABUS for the HI adder circuit 207.

Figure 8:
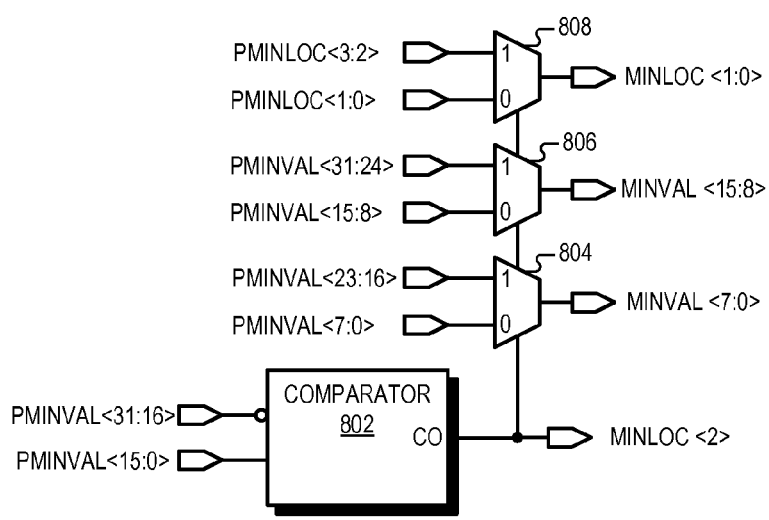
FIG. 8 is a schematic and block diagram of the HI/LO comparator circuit of FIG. 2 according to an exemplary embodiment.

FIG. 8 is a schematic and block diagram of the HI/LO comparator circuit 212 according to an exemplary embodiment. The PMINVAL<31:16> bits from the HI adder circuit 207 are provided to an inverting input of a 16-bit comparator circuit 802. The PMINVAL<15:0> bits from the LO adder circuit 203 are provided to a non-inverting input of the comparator circuit 802, which includes a carry output CO providing the MINLOC<2> signal. The comparator circuit 802 simply compares the HI and LO minimum words and determines the carry output as the MINLOC<2> bit. The carry output CO operates in a very similar manner as the CO of the adders previously described. If the word within PMINVAL<15:0> is greater than the word contained within PMINVAL<31:16>, then the CO output and thus MINLOC<2> is a logic 1. Otherwise, the CO output and thus MINLOC<2> is a logic 0. MINLOC<2> is the MSB of the location value MINLOC<2:0> since if MINLOC<2> is a logic 1, then the minimum word is located in the upper half of ABUS, and otherwise the minimum word is located in the lower half of ABUS. MINLOC<2> is provided as the select input of three MUXes 804, 806 and 808. The MUX 804 selects between byte values PMINVAL<23:16> and PMINVAL<7:0> representing the lower bytes of the minimum words found for the HI and LO portions, respectively, for determining the lower byte of MINVAL, or MINVAL<7:0>. The MUX 806 selects between byte values PMINVAL<31:24> and PMINVAL<15:8> representing the upper bytes of the minimum words found for the HI and LO portions, respectively, for determining the upper byte of MINVAL, or MINVAL<15:8>. The MUX 808 selects between location bits PMINLOC<3:2> and PMINLOC<1:0> representing the least significant location bits of the HI and LO portions, respectively, for determining MINLOC<1:0>. As noted above, the MSB of MINLOC, or MINLOC<2>, was already determined by the comparator circuit 802. so that MINLOC<2:0> is identifies the location of the minimum word within ABUS.

Although the present invention has been described in considerable detail with reference to certain preferred versions thereof, other versions and variations are possible and contemplated. For example, the circuits described herein may be implemented in any suitable manner including logic devices or circuitry or the like. Any number of the functions described for the logic circuits may be implemented in software or firmware or the like within an integrated device. The circuits described herein may include inverting devices implementing positive or negative logic or the like in which any signal may be inverted. The present invention is described using circuits operating with digital or binary bytes and words where it is understood that the circuitry applies to digital or binary values comprising any number of bits. Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor which is programmed to determine a minimum one of at least two binary values, comprising:
    a first adder which is configured to add upper bits of a first binary value with inverted upper bits of a second binary value, said first adder configured to provide a first carry output and a first propagate output;
    wherein said first adder is configured OR each bit of said upper bits of said first binary value with a corresponding bit of said inverted upper bits of said second binary value to provide a plurality of result bits and is configured to logically AND said plurality of result bits to provide said first propagate output;
    a second adder which is configured to add lower bits of said first binary value with inverted lower bits of said second binary value, said second adder configured to provide a second carry output; and
    a compare circuit which is configured to determine whether said first binary value is greater than said second binary value based on said first and second carry outputs and said first propagate output.

2. The microprocessor of claim 1, wherein said first and second binary values are unsigned.

3. The microprocessor of claim 1, wherein said first and second adders are configured to perform unsigned binary addition.

4. The microprocessor of claim 1, wherein said first and second binary values are unsigned binary words in which said first and second adders are configured to compare corresponding upper and lower bytes of first and second binary words.

5. The microprocessor of claim 1, wherein said first propagate output indicates whether a carry input would be propagated through said first adder.

6. The microprocessor of claim 1, wherein said compare circuit comprises:
    an OR gate having first and second inputs and an output, wherein said first input receives said first carry output and said output indicates whether said first binary value is greater than said second binary value; and
    an AND gate having first and second inputs and an output, wherein said first input receives said propagate output, wherein said second input receives said second carry output, and wherein said output is coupled to said second input of said OR gate.

7. A system for fast determination of a horizontal minimum of a plurality of digital values, comprising:
    a plurality of difference circuits, each configured to compare a first digital value with a second digital value;
    a routing circuit which is configured to route each of the plurality of digital values to at least one of said plurality of difference circuits in order to compare each digital value with every other one of the plurality of digital values;
    wherein each of said plurality of difference circuits comprises:
        an upper adder configured to compare an upper portion of a first digital value with an upper portion of a second digital value and to provide a corresponding one of a plurality of first carry outputs and a corresponding one of a plurality of propagate outputs; and a lower adder configured to compare a lower portion of said first digital value with a lower portion of said second digital value and to provide a corresponding one of a plurality of second carry outputs; and a compare circuit which is configured to combine said plurality of first and second carry outputs and said plurality of propagate outputs to determine a minimum one of the plurality of digital values, wherein said compare circuit comprises:

a first compare circuit which is configured to combine a first carry output, a second carry output and a propagate output of each of said plurality of difference circuits to provide a corresponding one of a plurality of comparison bits; and a second compare circuit which is configured to determine a minimum one of the plurality of digital values based on said plurality of comparison bits.

8. The system of claim 7, wherein said first compare circuit comprises AND logic and OR logic for each of said plurality of difference circuits, wherein said AND logic is configured to combine said first propagate output with said second carry output to provide a first bit, and wherein said OR logic is configured to combine said first bit with said first carry output to provide a corresponding one of said plurality of comparison bits.

9. The system of claim 7, wherein said second compare circuit is configured to decode said plurality of comparison bits to provide a plurality of minimum bits each identifying whether a corresponding one of the plurality of digital values is a lesser value.

10. The system of claim 7, wherein the plurality of digital values comprise unsigned binary words, wherein said upper portion comprises an upper byte and wherein said lower portion comprises a lower byte of a corresponding digital value.

11. The system of claim 7, wherein said upper adder and said lower adder of each of said plurality of difference circuits are configured to perform unsigned binary addition.

12. The system of claim 7, wherein each of said plurality of first propagate outputs indicates whether a carry input would be propagated through an upper adder of a corresponding one of said plurality of difference circuits.

13. The system of claim 7, wherein the plurality of digital values are stored in a memory, further comprising a location circuit which is configured to identify a location of said minimum one of the plurality of digital values within said memory.

14. The system of claim 7, further comprising:

a memory which stores the plurality of digital values;

said second compare circuit comprising a decode circuit which is configured to decode said plurality of comparison bits to provide a plurality of minimum bits;

a select circuit which is configured to select one of the plurality of digital values stored in said memory as a minimum value using said plurality of minimum bits; and a location circuit which is configured to provide a location value using said plurality of minimum bits wherein said location value identifies a location of said minimum value within said memory.

15. The system of claim 7, wherein said plurality of difference circuits, said routing circuit, and said compare circuit are integrated on a microprocessor chip.

16. A method of determining a minimum one of a plurality of digital values, comprising:

comparing, by a microprocessor, upper bits of a first digital value with upper bits of a second digital value and providing a first carry output and a propagate output;

comparing, by the microprocessor, lower bits of the first digital value with lower bits of the second digital value and providing a second carry output; and determining, by the microprocessor, which of the first and second digital values is a lesser value based on the first and second carry outputs and the propagate output;

wherein said comparing upper bits, comparing lower bits and determining being performed by each of a plurality of adder pairs of the microprocessor;

routing, by the microprocessor, each of a plurality of digital values to at least one of the plurality of adder pairs for comparing each digital value with every other one of the plurality of digital values; and determining, by the microprocessor, a minimum one of the plurality of digital values based on said comparing.

17. The method of claim 16, wherein said determining a minimum one of the plurality of digital values based on said comparing comprises combining a plurality of carry outputs and a plurality of propagate outputs for providing a plurality of compare bits, and decoding the plurality of compare bits.

18. The method of claim 16, further comprising determining, by the microprocessor, a memory location of the minimum one of the plurality of digital values stored within a memory.

19. A microprocessor which is configured to determine a minimum one of at least two binary values, comprising:

a first adder which is configured to add upper bits of a first binary value with inverted upper bits of a second binary value, said first adder configured to provide a first carry output and a first propagate output;

a second adder which is configured to add lower bits of said first binary value with inverted lower bits of said second binary value, said second adder configured to provide a second carry output; and a compare circuit which is configured to determine whether said first binary value is greater than said second binary value based on said first and second carry outputs and said first propagate output, wherein said compare circuit comprises:

an OR gate having first and second inputs and an output, wherein said first input receives said first carry output and said output indicates whether said first binary value is greater than said second binary value; and an AND gate having first and second inputs and an output, wherein said first input receives said propagate output, wherein said second input receives said second carry output, and wherein said output is coupled to said second input of said OR gate.

* * * * *